(12) United States Patent
Zhu et al.

(10) Patent No.: US 10,977,399 B2
(45) Date of Patent: Apr. 13, 2021

(54) METHODS AND SYSTEMS FOR CONDUCTING A TIME-MARCHING NUMERICAL SIMULATION OF A DEEP DRAWING METAL FORMING PROCESS FOR MANUFACTURING A PRODUCT OR PART

(71) Applicant: Livermore Software Technology Corporation, Livermore, CA (US)

(72) Inventors: Xinhai Zhu, Pleasanton, CA (US); Zhidong Han, Livermore, CA (US)

(*) Notice: Subject to any disclaimer, the term of this patent is extended or adjusted under 35 U.S.C. 154(b) by 360 days.

(21) Appl. No.: 16/169,802

(22) Filed: Oct. 24, 2018

(65) Prior Publication Data

US 2019/0057172 A1 Feb. 21, 2019

Related U.S. Application Data

(63) Continuation-in-part of application No. 14/861,976, filed on Sep. 22, 2015, now abandoned.

(51) Int. Cl.
*G06F 30/23* (2020.01)
*G06F 111/10* (2020.01)
*G06F 113/24* (2020.01)

(52) U.S. Cl.
CPC .......... *G06F 30/23* (2020.01); *G06F 2111/10* (2020.01); *G06F 2113/24* (2020.01)

(58) Field of Classification Search
None
See application file for complete search history.

(56) References Cited

U.S. PATENT DOCUMENTS

| 10,331,809 B2* | 6/2019 | Hirose | G06F 30/23 |
| 2009/0056468 A1* | 3/2009 | Kubli | G06F 30/15 |
| | | | 73/826 |

OTHER PUBLICATIONS

Hora et al. "A generalized approach for the prediction of necking and rupture phenomena in the sheet metal forming", Jan. 2012, Institute of Virtual Manufacturing, ETH Zurich.
USPTO Office Action for U.S. Appl. No. 14/705,295 dated Sep. 12, 2017.

(Continued)

*Primary Examiner* — Craig C Dorais

(57) ABSTRACT

A FEA model representing a product/part with certain finite elements for metal portion, metal necking failure criteria (critical and fracture strain values defined in form of loading path diagram) and the neck's characteristics (neck's width and a profile of strain values within the width) are received in a computer system. At each solution cycle of a time-marching simulation of a deep draw metal forming process using the FEA model, following operations are performed at each integration point of every finite element: identifying major and minor strain values and corresponding directions from the computed strain values, calculating an equivalent metal necking failure strain value ($\varepsilon_e$) in the major strain direction with a formula based on corresponding critical and fracture strain values, the neck's characteristics and a characteristic dimension in the major strain direction, and determining metal necking failure, which occurs when the major strain value is greater than $\varepsilon_e$.

18 Claims, 9 Drawing Sheets

(56) References Cited

OTHER PUBLICATIONS

USPTO Notice of Allowance for U.S. Appl. No. 14/705,295 dated Jan. 17, 2018.
USPTO Office Action for U.S. Appl. No. 14/861,976 dated Aug. 8, 2018.
USPTO Office Action for U.S. Appl. No. 15/157,301 dated Oct. 4, 2018.

* cited by examiner

US 10,977,399 B2

METHODS AND SYSTEMS FOR CONDUCTING A TIME-MARCHING NUMERICAL SIMULATION OF A DEEP DRAWING METAL FORMING PROCESS FOR MANUFACTURING A PRODUCT OR PART

CROSS-REFERENCE TO RELATED APPLICATIONS

This application is a continuation-in-part (CIP) of co-pending U.S. patent application Ser. No. 14/861,976 for "Methods And Systems For Conducting A Time-Marching Numerical Simulation Of A Structure Expected To Experience Metal Necking Failure", filed on Sep. 22, 2015.

FIELD

The patent document relates generally to computer-aided engineering analysis. More particularly, the present document relates to methods and systems for conducting a time-marching numerical simulation of a deep drawing metal forming process for manufacturing a product or part.

BACKGROUND

Computer aided engineering (CAE) has been used for supporting engineers in many tasks. For example, in a structure or engineering product design procedure, CAE analysis, particularly finite element analysis (FEA), has often been employed to predict structural behavior (e.g., stresses, displacements, etc.) under various simulated loading conditions (e.g., static or dynamic).

An example of using FEA is sheet metal forming, which has been used in the industry for years for creating metal parts from a blank sheet metal, for example, automobile manufacturers and their suppliers produce many parts using sheet metal forming.

One of the most used sheet metal forming processes is deep drawing, which involves a hydraulic or mechanical press pushing a specially-shaped punch into a matching die with a piece of blank sheet metal in between. Exemplary products made from this process include, but are not limited to, car hood, fender, door, automotive fuel tank, kitchen sink, aluminum can, etc. In some areas of the die, the depth of a part or product being made is generally more than half its diameter. As a result, the blank is stretched and therefore thinned in various locations due to the geometry of the part or product. The part or product is only good when there is no structural defect such as material failure (e.g., cracking, tearing, wrinkling, necking, etc.).

In order to numerically simulate metal necking failure in finite element analysis (e.g., a time-marching simulation of a deep drawing metal forming process), a failure criteria is specified by users of FEA. Prior art approaches have been developed from physical metal specimen testing using average strain around the neck in metal necking failure, for example, data obtained basing on average strain measured with strain gauges. As a result, users need to specify a set of metal necking failure criteria that are finite element mesh (element dimension) dependent. These prior art approaches often cause confusions and difficulties for preparing input data and lead to incorrect simulation because users need to prepare the failure criteria based on these artificial and ad hoc requirement.

BRIEF SUMMARY

This section is for the purpose of summarizing some aspects of the invention and to briefly introduce some preferred embodiments. Simplifications or omissions may be made to avoid obscuring the purpose of the section. Such simplifications or omissions are not intended to limit the scope of the invention.

Methods and systems for conducting a time-marching numerical simulation of a deep drawing metal forming process for manufacturing a product/part are disclosed. According to one aspect, a finite element analysis (FEA) model representing a product or part made at least in-part of metal, a set of metal necking failure criteria and characteristics of a neck are defined and received in a computer system. The FEA model contains at least certain finite elements for representing the metal portion of the product/part. The metal necking failure criteria includes respective critical strain and fracture strain values for various loading conditions or strain directions defined in form of a loading path diagram. The neck's width and a profile of strain values within the neck are included in the characteristics.

A time-marching numerical simulation of a deep drawing metal forming process for manufacturing the product/part using the FEA model is conducted to obtain numerically-calculated structural behaviors of the product/part. At each solution cycle of the time-marching simulation, the following operations are performed at each integration point of every finite element: (a) identifying major and minor strain values and corresponding directions from the computed strain values, (b) calculating an equivalent metal necking failure strain value in the major strain direction with a formula based on the corresponding critical and fracture strain values in the set of metal failure criteria, the characteristics of the neck and a corresponding characteristic dimension of the finite element with respect to the major strain direction, and (c) determining a metal necking failure, which occurs when the major strain value is greater than the calculated equivalent metal necking failure strain value. Then the product/part is manufactured in a deep drawing metal forming process based on the numerically-calculated structural behaviors obtained in the time-marching simulation.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1-8. However, those skilled in the art will readily appreciate that the detailed description given herein with respect to these figures is for explanatory purposes as the invention extends beyond these limited embodiments.

Figure 1:
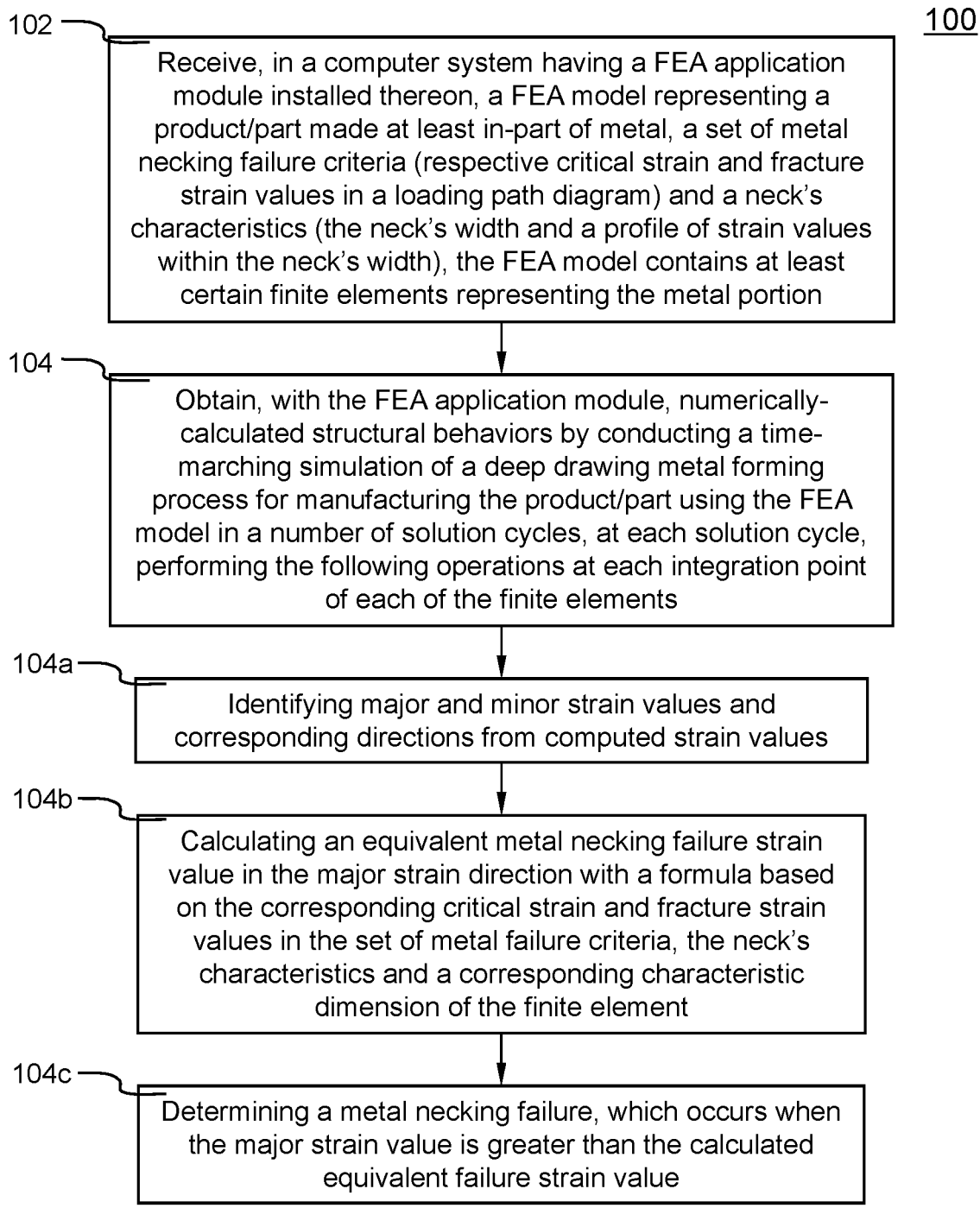
FIG. 1 is a flowchart illustrating an example process of conducting a time-marching numerical simulation of a deep drawing metal forming process for manufacturing a product or part, according to an embodiment of the invention.

Referring first to FIG. 1, it is a flowchart illustrating an example process 100 of conducting a time-marching numerical simulation of a deep drawing metal forming process for manufacturing a product or part. Process 100 is preferably implemented in software and understood with other figures.

Process 100 starts at action 102 by receiving a FEA model representing a product or part made at least in-part of metal, a set of user-specified metal necking failure criteria and characteristics of a neck in a computer system (e.g., computer system 800 of FIG. 8) having a FEA application module installed thereon. The FEA model contains at least certain finite elements for representing the metal portion of the product/part. The set of user-specified metal necking failure criteria includes respective critical and fracture strain values in various loading conditions or strain directions (e.g., the loading path diagram 300 in FIG. 3). The characteristics of the neck include the neck's width and a profile of strain values within the neck.

Figure 2:
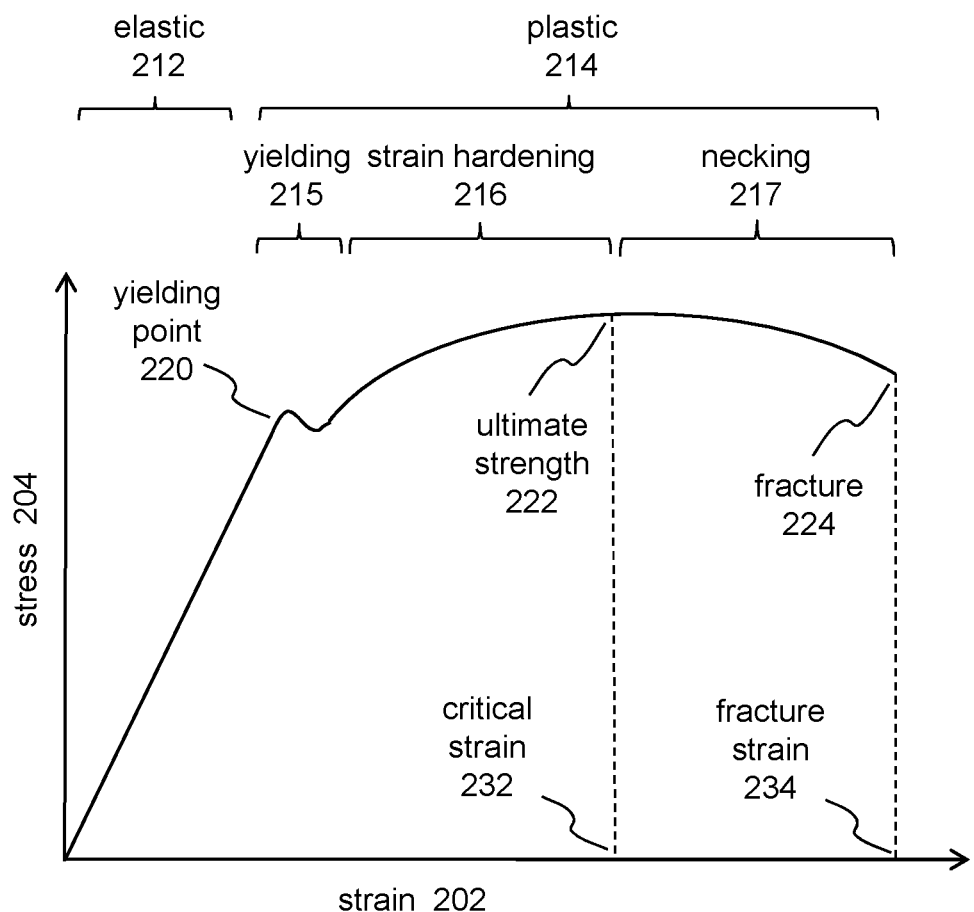
FIG. 2 is a diagram showing a stress-strain relationship of an example metal, according to an embodiment of the invention.

FIG. 2 shows an example stress-strain curve 200, which may be used for determining post-yielding structural behaviors including necking, according to one embodiment of the invention. The curve 200 has a vertical axis representing stress 204 and a horizontal axis for strain 202. Material has two regions: elastic 212 and plastic 214. Plastic region 214 is further divided into three categories: yielding 215, strain hardening 216 and necking 217. At the top end of the elastic region of the stress-strain curve 200 is a yielding point 220, to which the yielding stress corresponds. The critical strain 232 corresponds to the ultimate strength point 222 and the fracture strain 234 corresponds to the fracture location 224.

Figure 3:
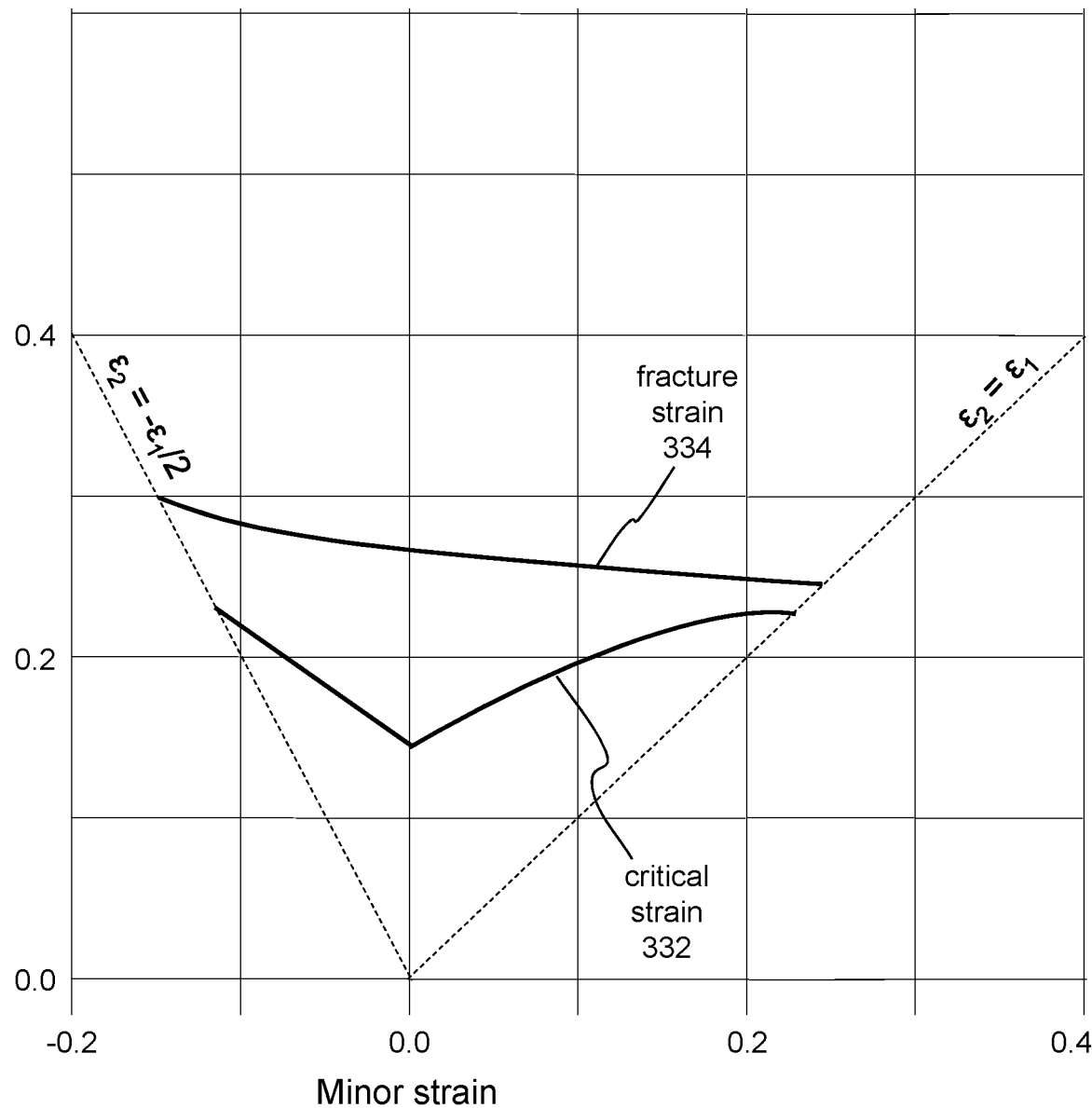
FIG. 3 is a diagram showing an example set of user-specified metal necking failure criteria in accordance with an embodiment of the invention.

FIG. 3 shows an example set of user-specified metal necking failure criteria in form of a loading path diagram 300, according to an embodiment of the invention. The loading path diagram 300 has two axes: a vertical axis representing strain values in major strain ($\varepsilon_1$) direction and a horizontal axis representing strain values in minor strain ($\varepsilon_2$) direction. The user-specified metal criteria are respective critical strain values 332 and fracture strain values 334 in various loading conditions or strain directions. For example, a bi-axial tension loading is illustrated as a dotted line marked by ($\varepsilon_2 = \varepsilon_1$). A uni-tension loading is shown as a dotted line marked by ($\varepsilon_2 = -\varepsilon_1/2$).

Referring back to process 100, at action 104, numerically-calculated structural behaviors of the product/part are obtained by conducting a time-marching numerical simulation of a deep drawing metal forming process for manufacturing a product/part using the FEA model with the FEA application module. The time-marching simulation contains a number of solution cycles or time steps. At each solution cycle, each integration point of each finite elements of the FEA model is determined whether it experiences a metal necking failure. The determination is achieved by the following operations: at action 104a, identifying major and minor strain values and corresponding directions from the computed strain values; at action 104b, calculating an equivalent metal failure strain value in the major strain direction from a formula based on the corresponding critical and fracture strain values in the user-specified metal failure criteria, the characteristics of the neck and a corresponding characteristic dimension of the finite element; and at action 104c, determining a metal necking failure, which occurs when the major strain value is greater than the calculated equivalent metal failure strain value. Then the product/part is manufactured in a deep drawing metal forming process based on the numerically-calculated structural behaviors obtained in the time-marching simulation.

Figure 4:
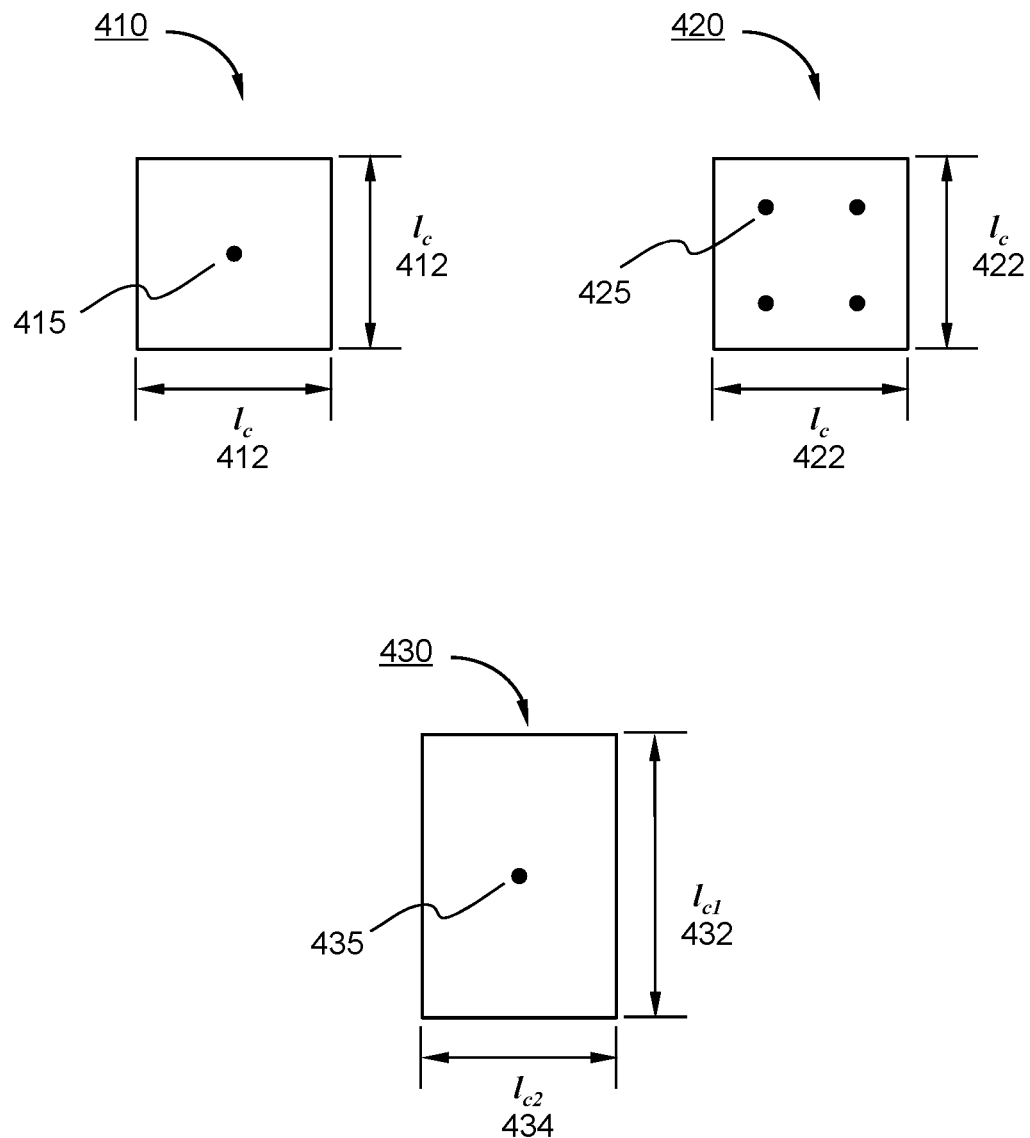
FIG. 4 is a diagram showing various example finite element that can be used in a FEA model, according to an embodiment of the invention.

FIG. 4 shows diagrams of various finite elements that can be used in the FEA model according to one embodiment of the invention. The first finite element 410 contains one integration point 415 with characteristic dimension $l_c$ 412. The second finite element 420 has four integration points 425 with characteristic dimension $l_c$ 422. The third finite element 430 contains one integration point 435 with two different characteristic dimensions $l_{c1}$ 432 and $l_{c2}$ 434. The integration point is a location within a finite element for FEA to perform numerical integration for computing structural behaviors such as strains. In a two-dimensional finite element, strains are computed in two directions of a coordinate system. For the purpose of the invention, the larger positive strain (i.e., stretch by tension) of the two computed strain values is referred to as a major strain. The other is referred to as the minor strain, which can be positive (under tension) or negative (under compression).

Figure 5A:
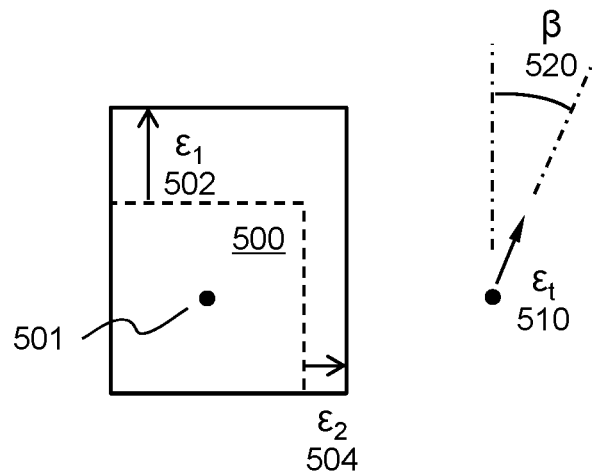
FIGS. 5A-5C are diagrams showing various examples of identifying major and minor strain values and corresponding directions at an integration point of a finite element according to an embodiment of the invention.
Figure 5B:
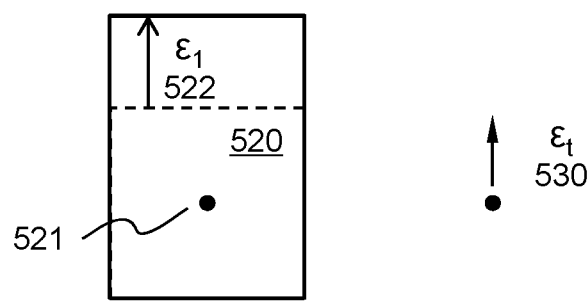
Figure 5C:
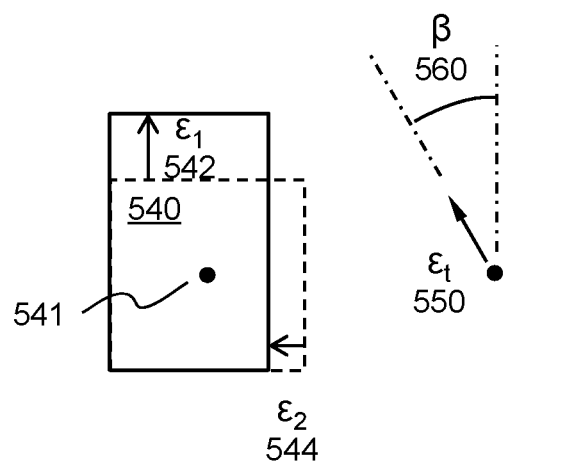

FIGS. 5A-5C show three examples of identifying major and minor strain values and corresponding directions at an integration point of a finite element in accordance with one embodiment of the invention. For illustration purpose, all of the strains or stretches are exaggerated for easier viewing.

In the first example shown in FIG. 5A, finite element 500 is stretched in both directions having a major strain ($\varepsilon_1$) 502 and a minor strain ($\varepsilon_2$) 504. Both strains are positive (i.e., under tension) and $\varepsilon_1 > \varepsilon_2$. At the integration point 501, the total strain value 510 is a resultant of the major strain value 502 and the minor strain value 504. The strain angle ($\beta$) 520 between the major and minor strain values defines the total strain direction, which correlates with one of the loading directions in the user-defined sheet-metal failure criteria (diagram 300 of FIG. 3).

In the second example shown in FIG. 5B, shell finite element 520 is stretched in one direction only having a major strain value ($\varepsilon_1$) 522. The minor strain is zero in this example (not drawn). As a result, the total strain value 530 at integration point 521 is equal to the major strain value 522. The stain angle is zero (not shown).

FIG. 5C shows the third example, in which the major strain value ($\varepsilon_1$) 542 is positive (i.e., under tension) while the minor strain value ($\varepsilon_2$) 544 is negative (under compression) for finite element 540. The total strain value 550 and the total strain direction defined by the strain angle ($\beta$) 560 are shown as a result.

The strain angle corresponds to the loading path of the loading path diagram 300. For example, shown in FIG. 3, the strain angle is equal to 45 degrees when $\varepsilon_1=\varepsilon_2$ in bi-axial tension loading path, while the strain angle is −22.5 degrees in the uni-axial tension loading path.

Figure 6A:
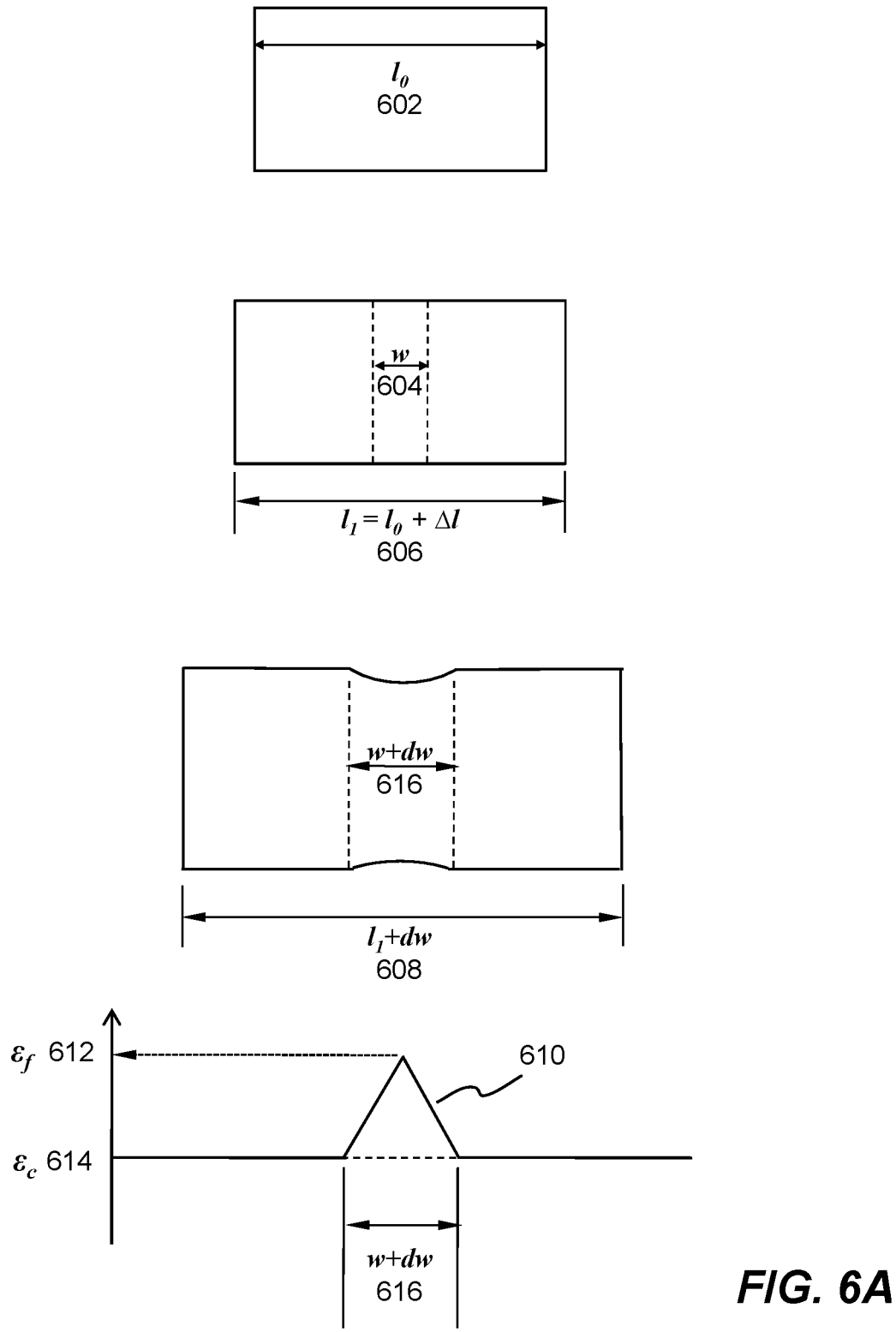
FIG. 6A is a series of diagrams showing an example profile of strain values between critical strain and fracture strain values in accordance with an embodiment of the invention.

FIG. 6A shows an example finite element under tension in its major strain direction (i.e., the horizontal direction in FIG. 6A). The metal starts with original undeformed dimension $l_0$ 602. In this example, $l_0$ 602 is the characteristic dimension $l_c$ of a finite element with respect to the major strain direction. The metal is stretched by additional length $\Delta l$ to the deformed length $l_1$ 606 (i.e., $l_1=l_0+\Delta l$) at the ultimate strength point right before the necking stage. Also shown in FIG. 6A is the neck width w 604, which can be obtained/measured from a physical material testing. At this point, the metal experiences the critical strain $\varepsilon_c$. The metal is further stretched to the final length $l_1$+dw 608 before fracture occurs, and the neck width is increased to a final width w+dw 616.

Further shown in FIG. 6A is an example profile of strain values between the critical strain value $\varepsilon_c$ 614 corresponding to the ultimate strength of the metal and the fracture strain value $\varepsilon_f$ 612 corresponding to the metal stretched right before the fracture. The profile has a triangular shape 610 in the neck within the final width w+dw 616 at the fracture. The area of the triangle 610 is (w+dw)*($\varepsilon_f-\varepsilon_c$)/2. The equivalent metal failure strain value $\varepsilon_e$ is then calculated as follows:

$$l_1 = l_0 + \Delta l$$
$$\varepsilon_c = \ln\frac{l_1}{l_0}$$
$$l_1 = l_0 e^{\varepsilon_c}$$
$$\ln\frac{dw}{w} = \frac{\varepsilon_f - \varepsilon_c}{2}$$
$$dw = we^{(\varepsilon_f-\varepsilon_c)/2}$$
$$\varepsilon_e = \ln\frac{l_1 + dw}{l_0}$$

Figure 7:
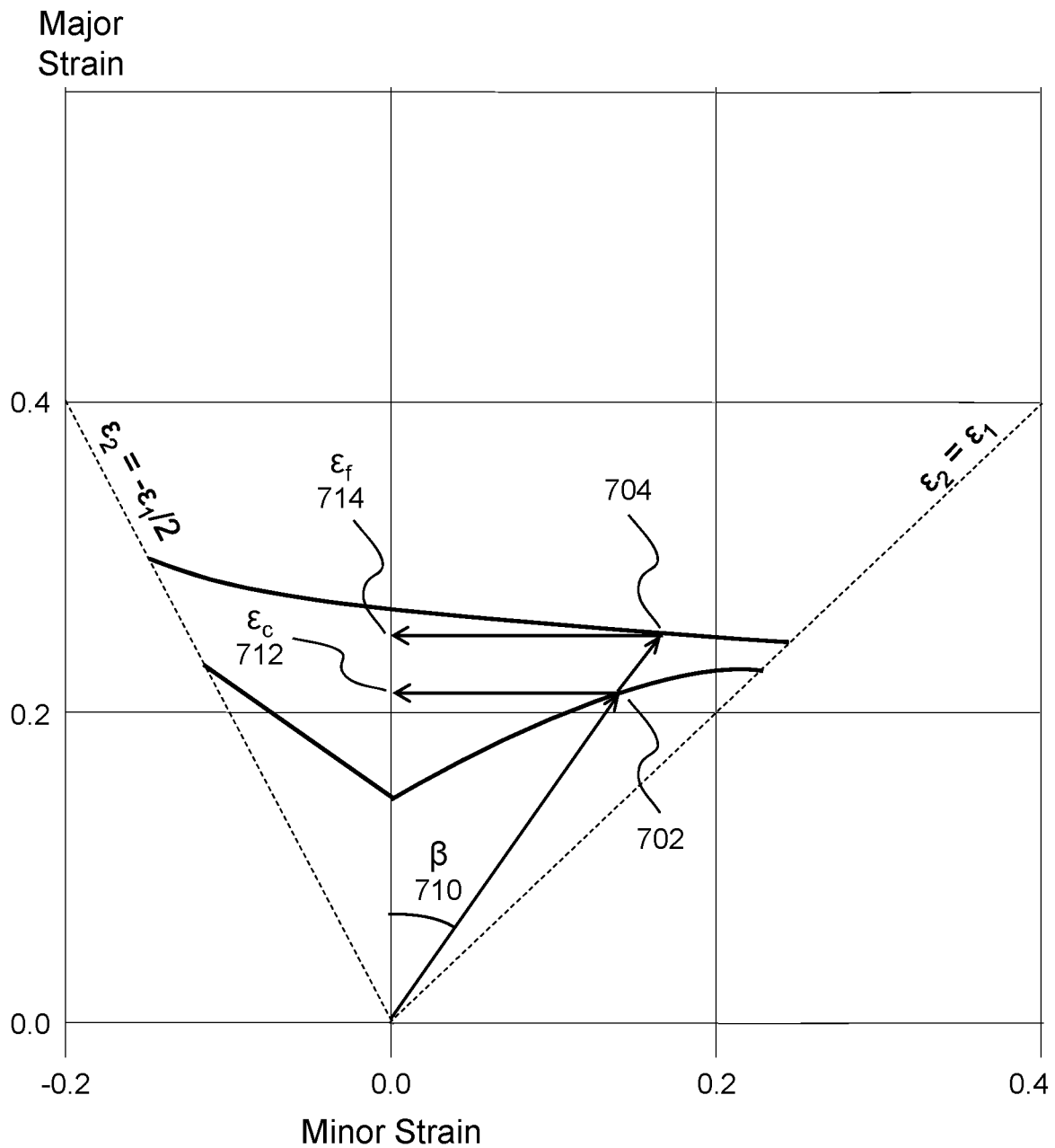
FIG. 7 is a diagram showing an example scheme to obtain respective critical and fracture strain values in accordance with one embodiment of the invention.

An example scheme is shown in FIG. 7 for obtaining respective critical and fracture strain values in the major strain direction. First, strain angle $\beta$ 710 is calculated from the identified major and minor strain values and directions. The critical strain value $\varepsilon_c$ 712 and fracture strain value $\varepsilon_f$ 714 in the major strain direction are then determined by projecting the corresponding critical and fracture strain values 702-704 located on the loading path defined by the strain angle 710.

Figure 6B:
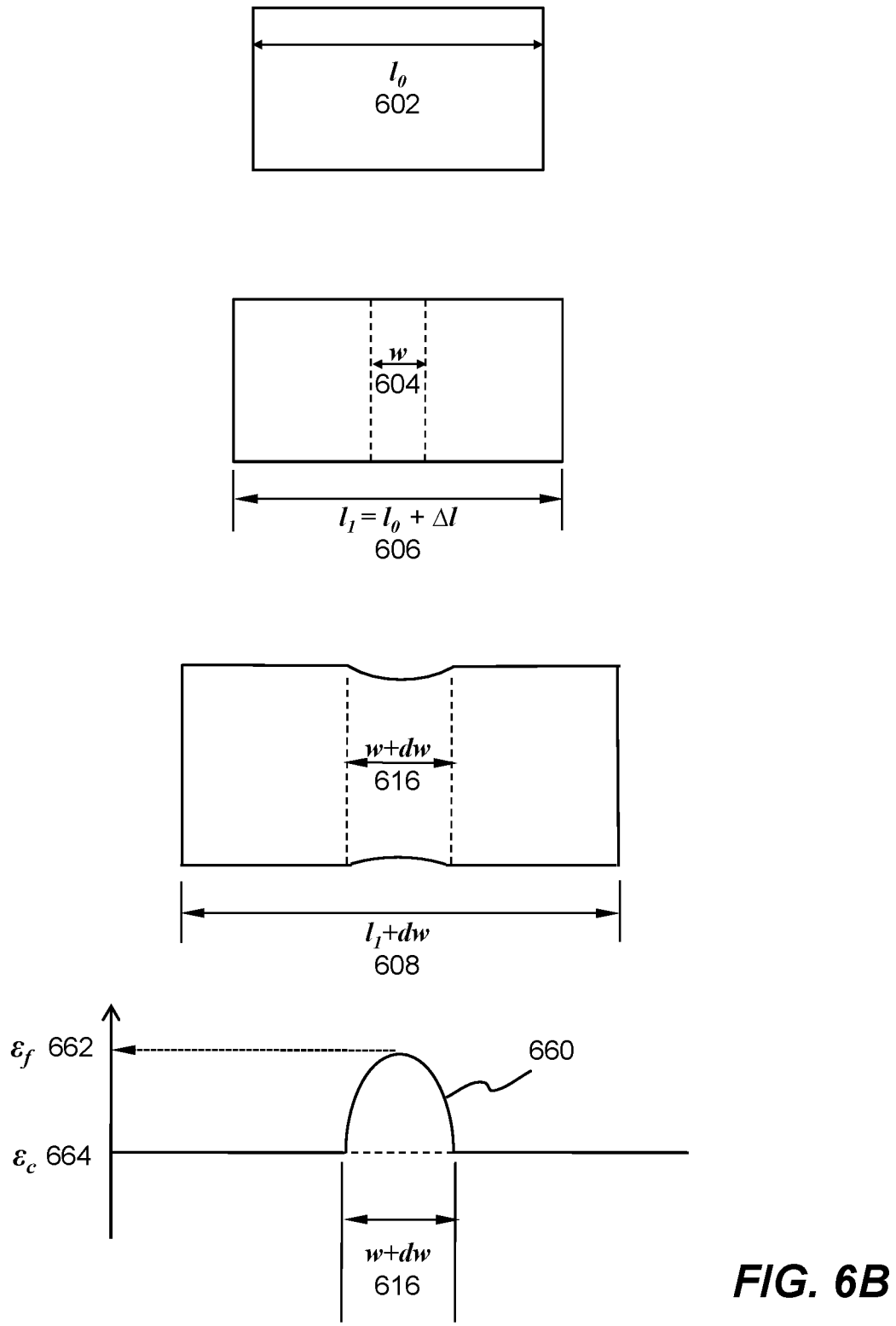
FIG. 6B is a series of diagrams showing an alternative example profile of strain values between critical strain and fracture strain values in accordance with an embodiment of the invention.

In an alternative embodiment, a curved profile 660 is shown in FIG. 6B. In order to establish an equivalent metal failure strain value, the area under the curved profile needs to be calculated.

Figure 8:
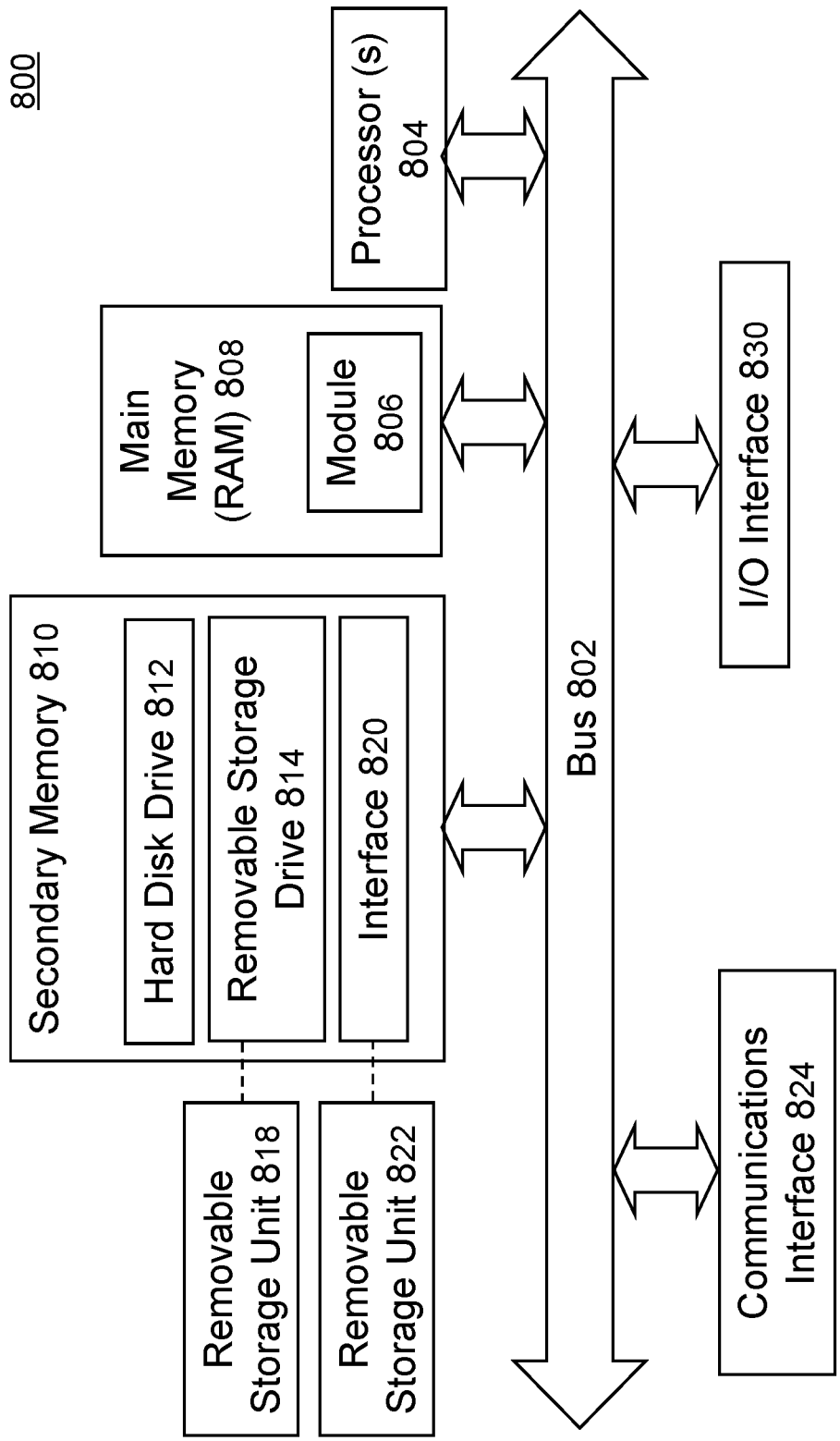
FIG. 8 is a functional block diagram showing salient components of an exemplary computer, in which an embodiment of the invention may be implemented.

According to one aspect, the invention is directed towards one or more computer systems capable of carrying out the functionality described herein. An example of a computer system 800 is shown in FIG. 8. The computer system 800 includes one or more processors, such as processor 804. The processor 804 is connected to a computer system internal communication bus 802. Various software embodiments are described in terms of this exemplary computer system. After reading this description, it will become apparent to a person skilled in the relevant art(s) how to implement the invention using other computer systems and/or computer architectures.

Computer system 800 also includes a main memory 808, preferably random access memory (RAM), and may also include a secondary memory 810. The secondary memory 810 may include, for example, one or more hard disk drives 812 and/or one or more removable storage drives 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 822 and interfaces 820 which allow software and data to be transferred from the removable storage unit 822 to computer system 800. In general, Computer system 800 is controlled and coordinated by operating system (OS) software, which performs tasks such as process scheduling, memory management, networking and I/O services.

There may also be a communications interface 824 connecting to the bus 802. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. The computer 800 communicates with other computing devices over a data network based on a special set of rules (i.e., a protocol). One of the common protocols is TCP/IP (Transmission Control Protocol/Internet Protocol) commonly used in the Internet. In general, the communication interface 824 manages the assembling of a data file into smaller packets that are transmitted over the data network or reassembles received packets into the original data file. In addition, the communication interface 824 handles the address part of each packet so that it gets to the right destination or intercepts packets destined for the computer 800. In this document, the terms "computer program medium" and "computer usable medium" are used to generally refer to media such as removable storage drive 814, and/or a hard disk installed in hard disk drive 812. These computer program products are means for providing software to computer system 800. The invention is directed to such computer program products.

The computer system 800 may also include an input/output (I/O) interface 830, which provides the computer system 800 to access monitor, keyboard, mouse, printer, scanner, plotter, and alike.

Computer programs (also called computer control logic) are stored as application modules 806 in main memory 808 and/or secondary memory 810. Computer programs may also be received via communications interface 824. Such computer programs, when executed, enable the computer system 800 to perform the features of the invention as discussed herein. In particular, the computer programs, when executed, enable the processor 804 to perform features of the invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. The application module 806, when executed by the processor 804, causes the processor 804 to perform the functions of the invention as described herein.

The main memory 808 may be loaded with one or more application modules 806 that can be executed by one or more processors 804 with or without a user input through the I/O interface 830 to achieve desired tasks. In operation, when at least one processor 804 executes one of the application modules 806, the results are computed and stored in the secondary memory 810 (i.e., hard disk drive 812). The status of the computer simulation of obtaining simulated structural behaviors (e.g., finite element analysis results) is reported to the user via the I/O interface 830 either in a text or in a graphical representation.

Although the invention has been described with reference to specific embodiments thereof, these embodiments are merely illustrative, and not restrictive of, the invention. Various modifications or changes to the specifically disclosed exemplary embodiments will be suggested to persons skilled in the art. For example, whereas the formula based on one profile of strain values has been shown and described, other profiles of strain values obtained/measured in a physical metal testing may be used to achieve the same. Furthermore, whereas two-dimensional finite elements have been shown and described for the invention, other types of finite elements may be used to achieve the same, for example, one-dimensional finite element (beam element) or three-dimensional finite element (solid element). Generally, there is one major strain value and two minor strain values in a three-dimensional finite element. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A method of conducting a time-marching simulation of a deep drawing metal forming process for manufacturing a product or part comprising:

receiving, in a computer system having a finite element analysis (FEA) application module installed thereon, a FEA model representing a product or part made at least in part of metal, a set of metal necking failure criteria and characteristics of a neck, the FEA model containing at least a plurality of finite elements that represents the product's metal portion, the metal necking failure criteria containing respective critical strain and fracture strain values in various strain directions, the characteristics of the neck including the neck's width and a profile of strain values within the neck's width;

obtaining, with the FEA application module, numerically-calculated structural behaviors of the product by conducting a time-marching numerical simulation using the FEA model, at each of a plurality of solution cycles in the time-marching simulation performing following operations at each integration point of each of the finite elements:

(a) identifying major and minor strain values and directions from computed strain values at said each integration point;

(b) calculating an equivalent metal necking failure strain value in the major strain direction with a formula based on the corresponding critical and fracture strain values in the set of metal failure criteria, the characteristics of the neck and a characteristic dimension of said each of the finite elements; and (c) determining a metal necking failure, which occurs when the major strain value is greater than the equivalent metal necking failure strain value; and manufacturing the product in a deep drawing metal forming process based on the numerically-calculated structural behaviors obtained in the time-marching simulation.

2. The method of claim 1, wherein said set of metal necking failure criteria is specified in form of a loading path diagram.

3. The method of claim 1, wherein said profile comprises two straight lines forming a triangle.

4. The method of claim 3, wherein said formula is as follows:

$$\varepsilon_e = \ln \frac{l_c e^{\varepsilon_c} + w e^{(\varepsilon_f - \varepsilon_c)/2}}{l_c}$$

where:

w is the neck's width, $\varepsilon_c$ is the critical strain value in the major strain direction, $\varepsilon_f$ is the fracture strain value in the major strain direction, $l_c$ is the characteristic dimension of said each of the finite element with respect to the major strain direction, and $\varepsilon_e$ is the equivalent metal necking failure strain value at said each integration point.

5. The method of claim 1, wherein said profile comprises one or more curves.

6. The method of claim 1, wherein said each of the finite elements contains at least one integration point.

7. A system for conducting a time-marching simulation of a deep drawing metal forming process for manufacturing a product or part comprising:

an input/output (I/O) interface;

a memory for storing computer readable code for a FEA application module;

at least one processor coupled to the memory, said at least one processor executing the computer readable code in the memory to cause the FEA application module to perform operations of:

receiving a FEA model representing a product or part made at least in part of metal, a set of metal necking failure criteria and characteristics of a neck, the FEA model containing at least a plurality of finite elements that represents the product's metal portion, the necking failure criteria containing respective critical strain and fracture strain values in various strain directions, the characteristics of the neck including the neck's width and a profile of strain values within the neck's width; and obtaining numerically-calculated structural behaviors of the product by conducting a time-marching numerical simulation using the FEA model, at each of a plurality of solution cycles in the time-marching simulation performing following operations at each integration point of each of the finite elements:
(a) identifying major and minor strain values and directions from computed strain values at said each integration point;
(b) calculating an equivalent metal necking failure strain value in the major strain direction with a formula based on the corresponding critical and fracture strain values in the set of metal failure criteria, the characteristics of the neck and a characteristic dimension of said each of the finite elements;
(c) determining a metal necking failure, which occurs when the major strain value is greater than the equivalent metal necking failure strain value; and
whereby the product is manufactured in a deep drawing metal forming process based on the numerically-calculated structural behaviors obtained in the time-marching simulation.

8. The system of claim 7, wherein said set of metal failure criteria is specified in form of a loading path diagram.

9. The system of claim 7, wherein said profile comprises two straight lines forming a triangle.

10. The system of claim 9, wherein said formula is as follows:

$$\varepsilon_e = \ln\frac{l_c e^{\varepsilon_c} + we^{(\varepsilon_f - \varepsilon_c)/2}}{l_c}$$

where:
w is the neck's width,
$\varepsilon_c$ is the critical strain value in the major strain direction,
$\varepsilon_f$ is the fracture strain value in the major strain direction,
$l_c$ is the characteristic dimension of said each of the finite element with respect to the major strain direction, and
$\varepsilon_e$ is the equivalent metal necking failure strain value at said each integration point.

11. The system of claim 7, wherein said profile comprises one or more curves.

12. The system of claim 7, wherein said each of the finite elements contains at least one integration point.

13. A non-transitory computer readable storage medium containing computer instructions for conducting a time-marching simulation of a deep drawing metal forming process for manufacturing a product or part, said computer instructions when executed on a computer system cause the computer system to perform operations of:

receiving, in a computer system having a finite element analysis (FEA) application module installed thereon, a FEA model representing a product or part made at least in part of metal, a set of metal necking failure criteria and characteristics of a neck, the FEA model containing at least a plurality of finite elements that represents the product's metal portion, the metal necking failure criteria containing respective critical strain and fracture strain values in various strain directions, the characteristics of the neck including the neck's width and a profile of strain values within the neck's width;

obtaining, with the FEA application module, numerically-calculated structural behaviors of the product by conducting a time-marching numerical simulation using the FEA model, at each of a plurality of solution cycles in the time-marching simulation performing following operations at each integration point of each of the finite elements:
(a) identifying major and minor total strain values and directions from computed strain values at said each integration point;
(b) calculating an equivalent metal necking failure strain value in the major strain direction with a formula based on the corresponding critical and fracture strain values in the set of metal failure criteria, the characteristics of the neck and a characteristic dimension of said each of the finite elements; and
(c) determining a metal necking failure, which occurs when the major strain value is greater than the equivalent metal necking failure strain value; and
whereby the product is manufactured in a deep drawing metal forming process based on the numerically-calculated structural behaviors obtained in the time-marching simulation.

14. The non-transitory computer readable storage medium of claim 13, wherein said set of sheet-metal necking failure criteria is specified in form of a metal forming limit diagram.

15. The non-transitory computer readable storage medium of claim 13, wherein said profile comprises two straight lines forming a triangle.

16. The non-transitory computer readable storage medium of claim 15, wherein said formula is as follows:

$$\varepsilon_e = \ln\frac{l_c e^{\varepsilon_c} + we^{(\varepsilon_f - \varepsilon_c)/2}}{l_c}$$

where:
w is the neck's width,
$\varepsilon_c$ is the critical strain value in the major strain direction,
$\varepsilon_f$ is the fracture strain value in the major strain direction,
$l_c$ is the characteristic dimension of said each of the finite element with respect to the major strain direction, and
$\varepsilon_e$ is the equivalent metal necking failure strain value at said each integration point.

17. The non-transitory computer readable storage medium of claim 13, wherein said profile comprises one or more curves.

18. The non-transitory computer readable storage medium of claim 13, wherein said each of the finite elements contains at least one integration point.

* * * * *